(12) United States Patent
Hu

(10) Patent No.: US 12,078,526 B2
(45) Date of Patent: Sep. 3, 2024

(54) REDUCED COMPLEXITY POLARIZATION COMBINING METHOD FOR COHERENT DAS

(71) Applicant: NEC Laboratories America, Inc., Princeton, NJ (US)

(72) Inventor: Junqiang Hu, Davis, CA (US)

(73) Assignee: NEC Corporation, Tokyo (JP)

( * ) Notice: Subject to any disclaimer, the term of this patent is extended or adjusted under 35 U.S.C. 154(b) by 267 days.

(21) Appl. No.: 17/522,844

(22) Filed: Nov. 9, 2021

(65) Prior Publication Data

US 2022/0146304 A1   May 12, 2022

Related U.S. Application Data

(60) Provisional application No. 63/111,784, filed on Nov. 10, 2020.

(51) Int. Cl.
*G06F 11/30* (2006.01)
*G01H 9/00* (2006.01)
*G02F 1/125* (2006.01)
*H04B 10/61* (2013.01)

(52) U.S. Cl.
CPC ............ *G01H 9/004* (2013.01); *G02F 1/125* (2013.01); *H04B 10/613* (2013.01); *H04B 10/6151* (2013.01)

(58) Field of Classification Search
CPC ....................................................... G02F 1/125
See application file for complete search history.

(56) References Cited

U.S. PATENT DOCUMENTS

| | | | | |
|---|---|---|---|---|
| 2010/0309477 A1* | 12/2010 | Yun | .................. | G01J 3/0218 |
| | | | | 356/497 |
| 2014/0079386 A1* | 3/2014 | Yasuda | ................ | H04B 10/616 |
| | | | | 398/16 |
| 2020/0249076 A1* | 8/2020 | Ip | ........................... | G01H 9/004 |

FOREIGN PATENT DOCUMENTS

WO   WO-2019148061 A1 *  8/2019  ............. G01H 9/004

OTHER PUBLICATIONS

Written Opinion for PCT/US2021/058861 (Year: 2022).*
Translation of JP-2017516093 Jun. 2017 (Year: 2017).*

* cited by examiner

*Primary Examiner* — Phuong Huynh
(74) *Attorney, Agent, or Firm* — Joseph Kolodka

(57) ABSTRACT

Aspects of the present disclosure are directed to improved systems, methods, and structures providing coherent detection of DAS. In sharp contrast to the prior art, systems, methods, and structures according to aspects of the present disclosure advantageously reduce the beating diversity terms such that required memory and bandwidth are reduced over the art.

5 Claims, 6 Drawing Sheets

REDUCED COMPLEXITY POLARIZATION COMBINING METHOD FOR COHERENT DAS

CROSS REFERENCE TO RELATED APPLICATIONS

This application claims the benefit of U.S. Provisional Patent Application Ser. No. 63/111,784 filed 10 Nov. 2020, the entire contents of each is incorporated by reference as if set forth at length herein.

TECHNICAL FIELD

This disclosure relates generally to coherent distributed acoustic sensing (DAS). More particularly, it discloses a processing architecture for use in coherent distributed acoustic sensing (DAS) that employs polarization diversity combining to reduce the processing complexity.

BACKGROUND

As is known, coherent DAS uses differential beating for every two selected locations along an optical fiber to detect fiber stress at location(s) in between the two. Coherent optical detection has X and Y polarization diversities, which changes randomly due to fiber movement or other factors. For this reason, the beating may use X-X, X-Y, Y-X, and Y-Y to fully utilize all the power, which results in 4 polarization diversities $\zeta_{xx}$, $\zeta_{xy}$, $\zeta_{yx}$, and $\zeta_{yy}$. Subsequent processing is required to combine the 4 diversity terms into a single term.

DAS received samples are in sequence of location-by-location within each frame, while the polarization diversity combining process requires frame-by-frame processing for each location. The sequence conversion requires large amount of memory and bandwidth. Doubling the diversity terms from beating process further doubles the memory and bandwidth needed.

As a result, systems, methods, and structures that ameliorate such requirements would represent a significant advance in the art.

SUMMARY

An advance in the art is made according to aspects of the present disclosure directed to improved systems, methods, and structures providing coherent detection of DAS. In sharp contrast to the prior art, systems, methods, and structures according to aspects of the present disclosure advantageously reduce the beating diversity terms such that required memory and bandwidth are reduced over the art.

According to aspects of the present disclosure, X and Y polarizations are merged before beating, since polarization switching is a slow process as compared to location sampling rate (i.e., DAS pulse or frame repetition rate). Operationally, the two polarizations are first aligned to the same direction before merging, by rotating one of the polarizations (X or Y) to the other (Y or X), then rotated to maintain phase continuity.

In one embodiment, the two polarizations first align to the one having higher averaged power (say pol-P). The X-Y combined signal is then passed to the beating module for differential beating, followed by phase extraction or other additional processing.

Advantageously, systems, methods, and structures according to aspects of the present disclosure combines the two polarizations into one output before beating, such that there is only a single input to a beating module and only one output from beating. This inventive operation advantageously reduces the processing complexity and memory size.

According to additional aspects of the present disclosure, a first rotation is performed and used to align the two polarizations; uses a second rotation to maintain phase continuity when the higher power polarization changes from one to the other. This second rotation guarantees that the phase difference between two samples at the beating output completely reflects the signal plus noise, not other effect added by the processing.

BRIEF DESCRIPTION OF THE DRAWING

A more complete understanding of the present disclosure may be realized by reference to the accompanying drawing in which.

Figure 1A:
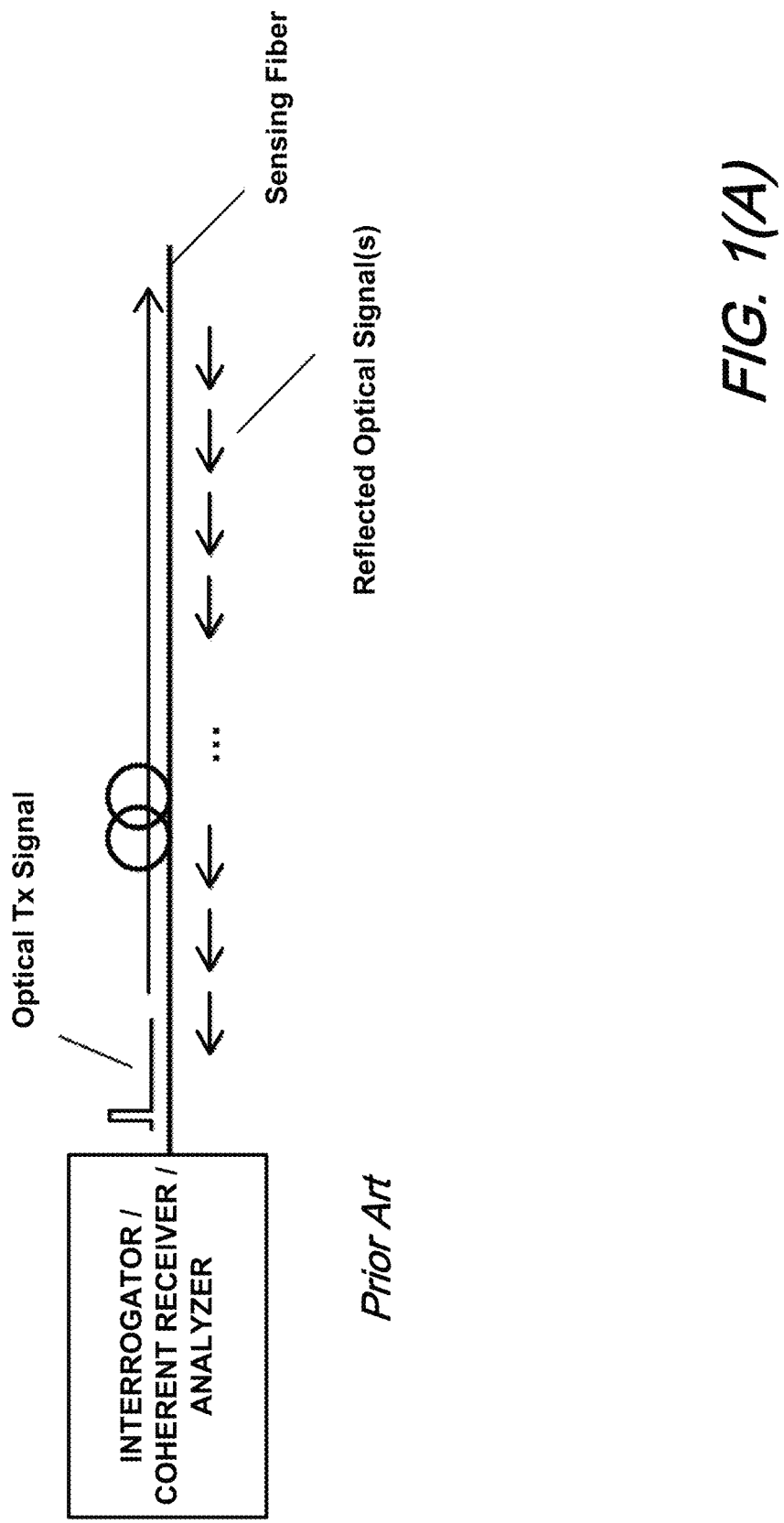
FIG. 1(A) is a schematic diagram of an illustrative prior art DAS arrangement.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—we again note that in recent years, distributed fiber optic sensing (DFOS) systems including distributed vibration sensing (DVS) and distributed acoustic sensing (DAS) have found widespread acceptance in numerous applications including—but not limited to—infrastructure monitoring, intrusion detection, and earthquake detection. For DAS and DVS, backward Rayleigh scattering effects are used to detect changes in the fiber strain, while the fiber itself acts as the transmission medium for conveying the optical sensing signal back to an interrogator for subsequent analysis.

FIG. 1(A) shows a simplified schematic diagram of a prior art DFOS/DVS/DAS system employing an interrogator/coherent receiver/detection/analysis system. Operationally, such a system generates/applies an optical Tx signal into an optical sensing fiber which results in reflected/scattered optical signals being directed back to the receiver/analysis system which receives/detects/analyzes the reflected/scattered and subsequently received signals. The signals are analyzed, and an output is generated which is indicative of the environmental conditions encountered along the length of the fiber.

Figure 1B:
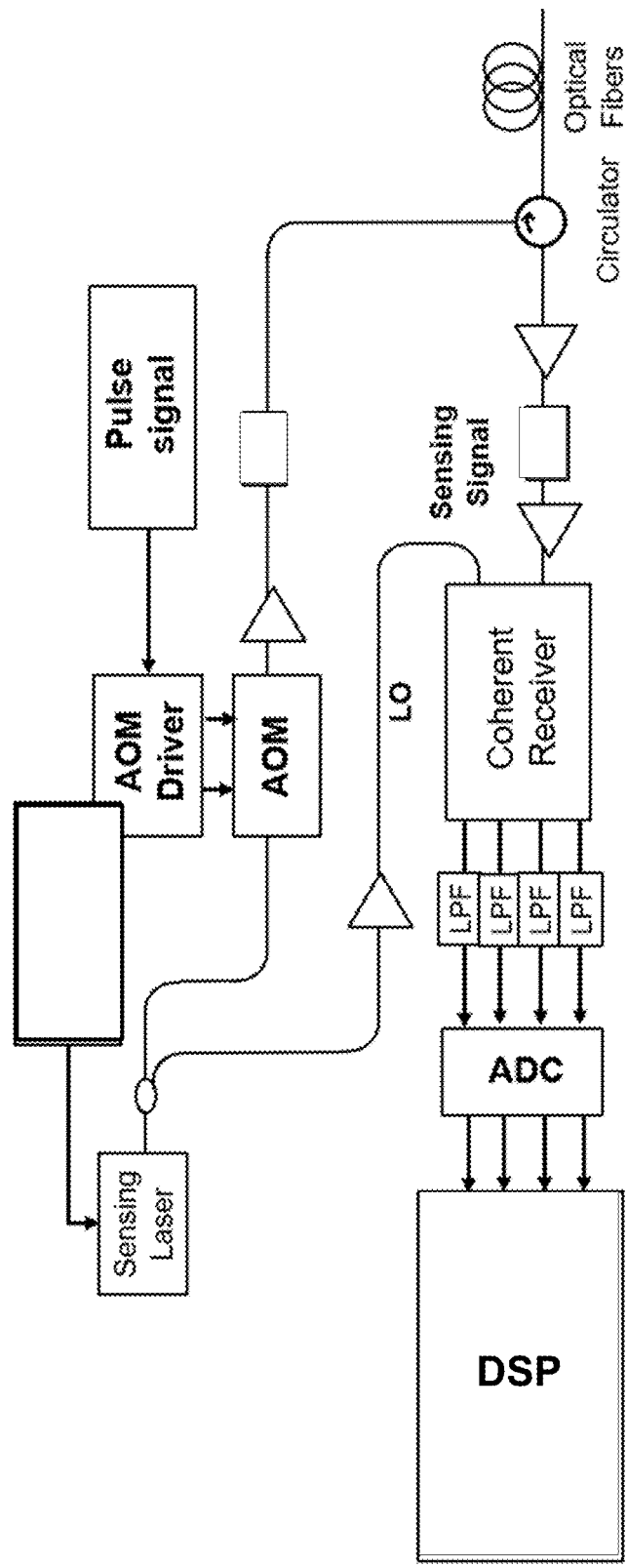
FIG. 1(B) is a schematic diagram of an illustrative coherent DAS arrangement according to aspects of the present disclosure.

FIG. 1(B) is a schematic block diagram of an illustrative coherent DAS system according to aspects of the present disclosure. Since a coherent DAS system uses Rayleigh scattering to detect acoustic signal along a sensing fiber, it generally employs an interrogator that includes a transmitter (Tx) that generates an optical signal (pulse or code) periodically. The optical signal is directed into a distributed sensing fiber. Each location along the fiber reflects a small portion of the optical signal back to the interrogator. The backscattered signal is processed in the Rx section to recover the acoustic signal or detect the vibration.

As previously noted, coherent DAS uses differential beating for every two selected locations along an optical fiber to detect fiber stress at location(s) in between the two selected locations. Coherent optical detection has X and Y polarization diversities, which changes randomly due to fiber movement or other factors. For this reason, the beating may use X-X, X-Y, Y X, and Y-Y to fully utilize all the power, which results in 4 polarization diversities $\zeta_{xx}$, $\zeta_{xy}$, $\zeta_{yx}$, and $\zeta_{yy}$. Subsequent processing is required to combine the 4 diversity terms into a single term.

DAS received signal samples are received in sequence of location-by-location within each frame, while the polarization diversity combining process requires a frame-by-frame processing for each location. The sequence conversion requires large amount of memory and bandwidth. Doubling the diversity terms from beating process further doubles the memory and bandwidth needed.

Systems, methods and structures according to aspects of the present disclosure generally operate within or in conjunction with the receiver, and advantageously reduces the memory and bandwidth required by reducing beating diversity terms.

According to aspects of the present disclosure, X and Y polarizations are merged before beating, since polarization switching is a slow process as compared to location sampling rate (i.e., DAS pulse or frame repetition rate). Operationally, the two polarizations are first aligned to the same direction before merging, by rotating one of the polarizations (X or Y) to the other (Y or X), then rotated to maintain phase continuity.

The two polarizations first align to the one having higher averaged power (say pol-P). The X-Y combined signal is then passed to the beating module for differential beating, followed by phase extraction or other additional processing.

Advantageously, systems, methods, and structures according to aspects of the present disclosure combines the two polarizations into one output before beating, such that there is only a single input to a beating module and only one output from beating. This overall inventive operation advantageously reduces the processing complexity and memory size.

According to additional aspects of the present disclosure, a first rotation is performed and used to align the two polarizations; uses a second rotation to maintain phase continuity when the higher power polarization changes from one to the other. This second rotation guarantees that the phase difference between two samples at the beating output completely reflects the signal plus noise, not other effect added by the processing.

For this discussion, we use $\bar{x}$ for temporal average (or low-pass filtered value), x* for complex conjugate. As previously noted, A coherent DAS system uses Rayleigh scattering to detect acoustic signal along the connected fiber. It includes a transmitter (Tx) section that periodically generates an optical pulse signal or code signal periodically. The signal is directed into a distributed sensing fiber. Each location along the fiber reflects/scatters a small portion of the optical signal back to the interrogator. The backscattered signal is processed in a Rx section to recover acoustic signals or detect vibrations. Our focus of this disclosure is the receiver section, in particular the combination of signals exhibiting different polarization diversities into a single signal.

Figure 2A:
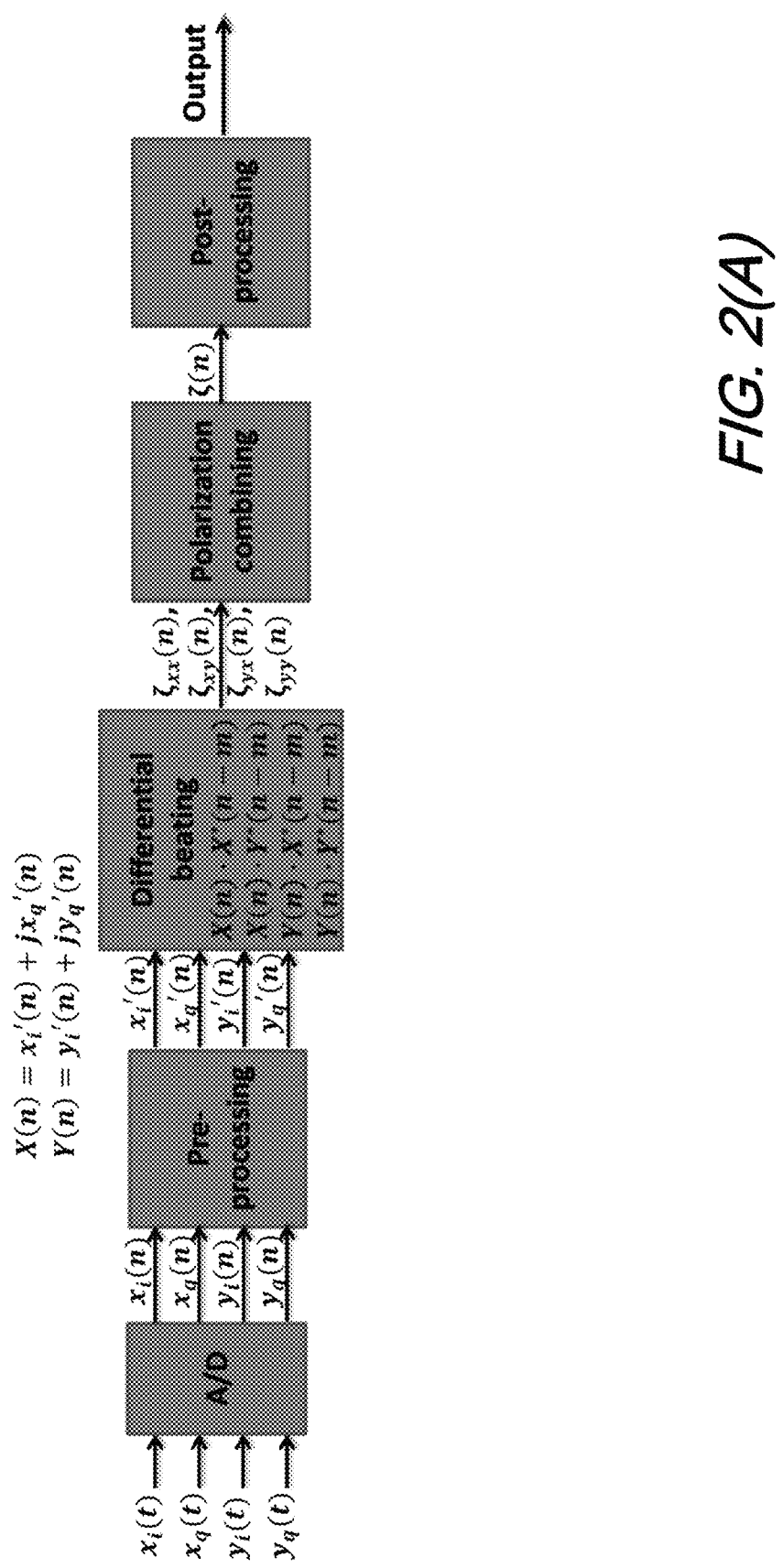
FIG. 2(A) is a schematic diagram of an illustrative prior art coherent DAS operational/processing arrangement.
Figure 2B:
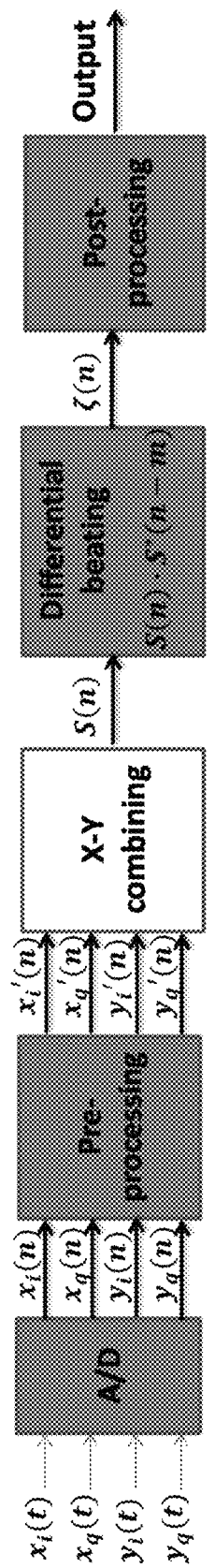
FIG. 2(B) is a schematic diagram of an illustrative coherent DAS operational/processing arrangement according to aspects of the present disclosure.

FIGS. 2(A) and 2(B) illustrate coherent DAS receiver processing according to the prior art (FIG. 2(A) and the present disclosure (FIG. 2(B)). As shown in the figure(s), an A/D is an analog-to-digital converter/process that samples a continuous time domain signal (analog) and converts same to a discrete digitized signal (digital). Next, the resulting signals are pre-processed which may include frequency conversion, filtering, down-sampling, and/or decoding. Differential beating is performed on the pre-processed signals and generates an inner product of two signals which are representative of represent the phase change. Polarization combining merges multiple polarization diversity terms into a single signal. The resulting single signal is post processed which may include phase unwrapping from complex signal(s), signal filtering, and subsequent vibration detection provided as output.

As shown in FIG. 2(B), DAS Rx processing according to aspects of the present disclosure advantageously performs X-Y combining prior to the differential beating processing. Importantly—rather than processing four polarization diversity terms $\zeta_{xx}$, $\zeta_{xy}$, $\zeta_{yx}$, and $\zeta_{yy}$ following differential beating output—systems, methods and structures according to aspects of the present disclosure performs polarization combining before differential beating such that it (differential beating) receives a single input S(n) and outputs only a a single $\zeta(n)$ output.

In coherent DAS, a signal $R_s$ at time n has an associated location z, which is the relative time to the start of the interrogating pulse or code. Polarization combining such as that illustrated in FIG. 2(A) treats each location independently, which effectively processes $R_s(z,m)$ for each location z over time m.

To simplify the discussion, the following sections focus on a single location z, unless otherwise specified.

The procedure to achieve this is performed through a two steps' rotation. The first step is an X-Y alignment, that rotates the polarization of the one exhibiting a lower averaged power to the polarization of the higher one. The second step performed involves rotating by a dynamically updated angle to maintain phase continuity. The detailed flow chart of the procedure is given in FIG. 3, with simplified Matlab code shown in the listing that follows. Note that the averaged phase difference $P_{diff}(n)$ used in the rotations is the normalized to $P_{diff}(n)/|P_{diff}(n)|$, as described in the Matlab pseudocode listing.

A simplified MATLAB code listing showing this first rotation and second rotation according to aspects of the present disclosure is as follows:

---
MATLAB Program Listing
---
```
             % calculate x-y phase difference and averaged difference
diff = x.* conj(y);         % phase difference
Pdiff(1) = a*diff(1);       % averaged phase difference.
                            'a' is low pass filter coefficient, using
                            % y(n)=(1-a)*y(n-1)+a*x(n)
for i=2:siglen,             % siglen: length of signal x and y
   Pdiff(i) = (1-a)*Pdiff(i-1) + a*diff(i);
end
             % first rotation, to align x and y
xr = zeros(1, siglen);      % aligned and combined x-y signals
for i=2:siglen,
   if xa(i)>ya(i),          % xa / ya: X / Y polarization average power
                            % rotate y to x
      xr(i) = x(i) + y(i)*Pdiff(i)/abs(Pdiff(i));
   else                     % rotate x to y
      xr(i) = y(i) + x(i)*conj(Pdiff(i))/abs(Pdiff(i));
   end
end
             % second rotation, to keep phase continuity
R = zeros(1, siglen);       % complex signal for 2^nd rotation
R(1) = 1+0*j;
for i=2:siglen,
                            % angle to rotate
   if xa(i)>ya(i) && xa(i-1)<=ya(i-1), % higher power polarization
changes from y to x
      R(i) = R(i-1) * conj(Pdiff(i))/abs(Pdiff(i));
   elseif xa(i)<=ya(i) && xa(i-1)>ya(i-1), % higher power polarization
changes from x to y
      R(i) = R(i-1) * Pdiff(i)/abs(Pdiff(i));
   else
      R(i) = R(i-1);
   end
                            % rotate
   xr(i) = xr(i)*R(i);
end
```

Figure 3:
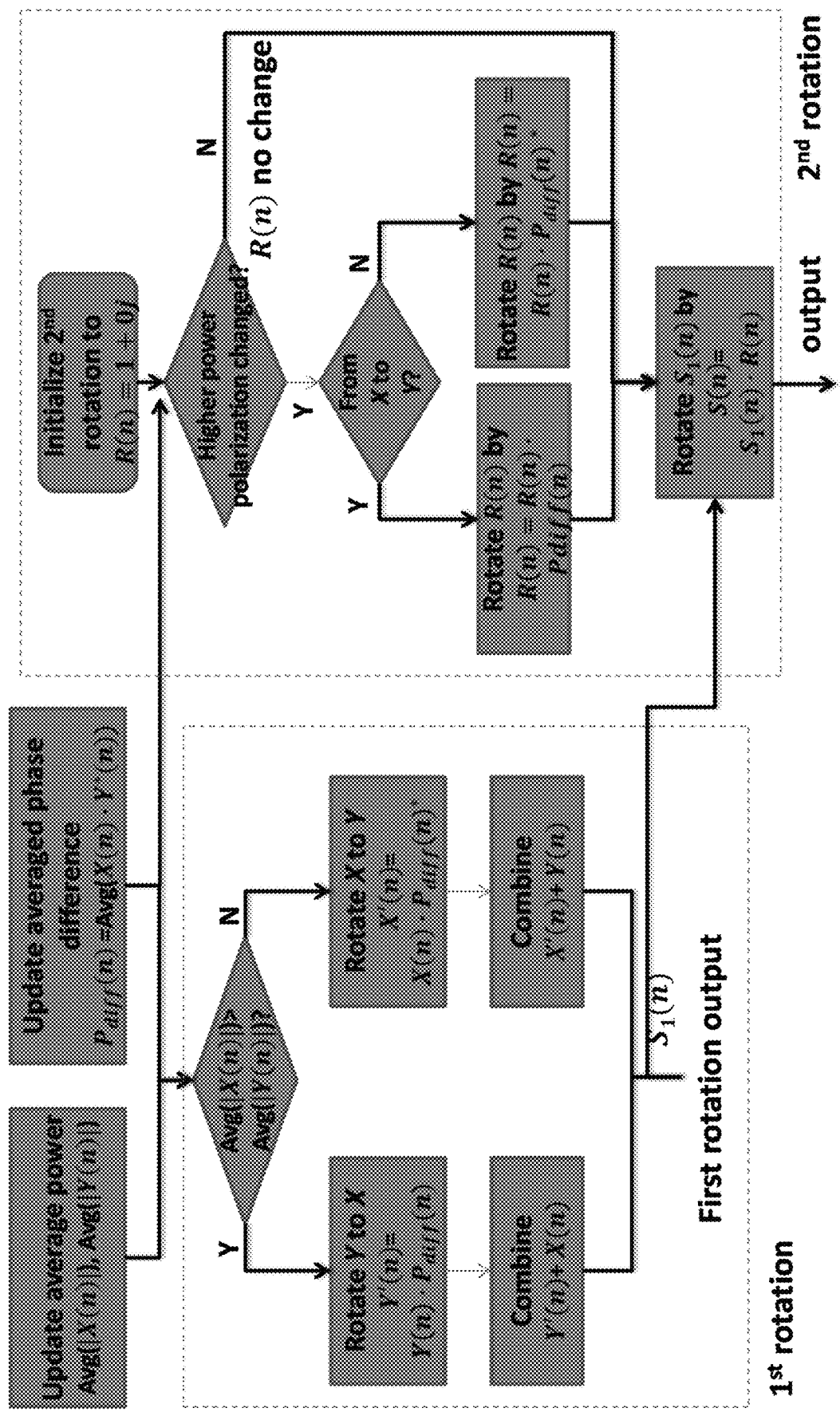
FIG. 3 is a flow diagram outlining operation of an illustrative coherent DAS according to aspects of the present disclosure.

The polarization combining illustratively shown in the flow chart of FIG. 3 uses the original amplitude of x and y rotated by normalized $P_{diff}$. In one embodiment, the combining may apply a weight, using the averaged amplitude as:

$$xr(i)=x(i)*xa(i)/(xa(i)+ya(i))+y(i)*Pdiff(i)/abs(Pdiff(i))*ya(i)/(xa(i)+ya(i));$$

or:

$$xr(i)=y(i)*ya(i)/(xa(i)+ya(i))+x(i)*conj(Pdiff(i))/abs(Doff(i))*xa(i)/(xa(i)+ya(i)).$$

To simplify the implementation, the first rotation and combining can be reduced by using the higher power signal only, namely:

$$xr(i) = \begin{cases} x(i), & \text{if } xa(i) \geq ya(i) \\ y(i), & \text{otherwise} \end{cases}.$$

Figure 4:
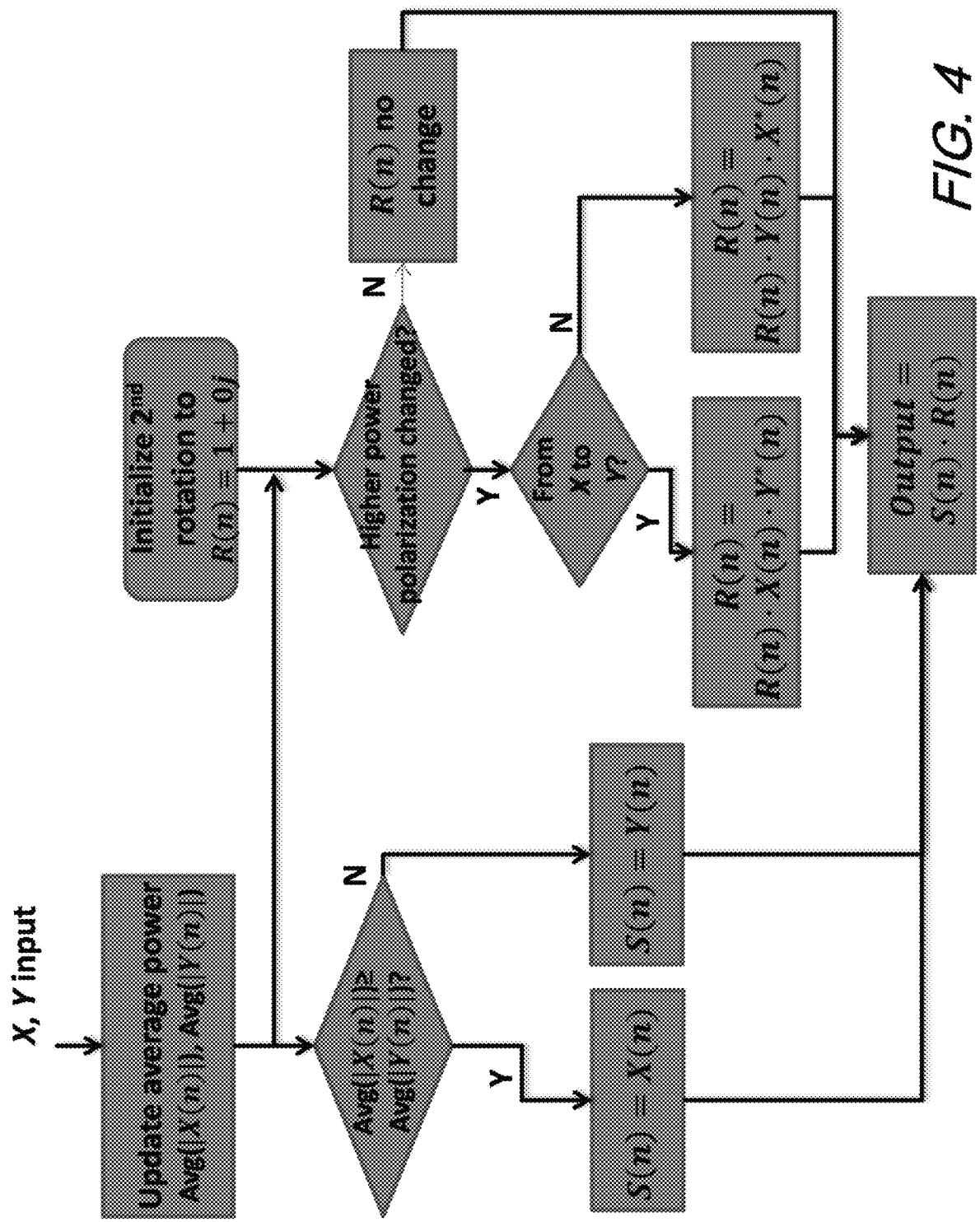
FIG. 4 is a flow diagram describing an illustrative method according to aspects of the present disclosure.

To further reduce the processing complexity, the second rotation can be updated by the instant phase difference, using $$R(n) = \begin{cases} R(n) \cdot (x(n) \cdot y(n)^*), & \text{if } xa(n-1) \geq ya(n-1) \text{ and } xa(n) < ya(n) \\ R(n) \cdot (y(n) \cdot x(n)^*), & \text{if } xa(n-1) < ya(n-1) \text{ and } xa(n) \geq ya(n), \\ R(n), & \text{otherwise} \end{cases}$$

as shown in the the corresponding flow chart shown in FIG. 4.

At this point, while we have presented this disclosure using some specific examples, those skilled in the art will recognize that our teachings are not so limited. Accordingly, this disclosure should be only limited by the scope of the claims attached hereto.

The invention claimed is:

1. A reduced complexity polarization combining method for a coherent distributed acoustic sensing (DAS) system including
    a length of optical sensing fiber,
    an optical interrogator that generates optical pulses, introduces them into the optical fiber and receives Rayleigh reflected signals from the fiber, and
    a coherent receiver including an analog-to-digital-converter (ADC), and a digital signal processor (DSP), collectively configured to extract information from the Rayleigh reflected signals,
    the method comprising:
    operating the DAS system to obtain a set of in-phase and quadrature time-domain data;
        $x_i(t)$, $x_q(t)$, $y_i(t)$, $y_q(t)$;
    digitizing, by the ADC, the set of in-phase and quadrature time-domain data to generate a set of in-phase and quadrature data corresponding to the in-phase and quadrature time-domain data, $x_i(n)$, $x_q(n)$, $y_i(n)$, $y_q(n)$;
    optionally pre-processing, by the DSP, the digitized set of in-phase and quadrature data; to obtain a pre-processed set of in-phase and quadrature data $x_i'(n)$, $x_q'(n)$, $y_i'(n)$, $y_q'(n)$;
    x-y-combining, by the DSP, the polarizations of optionally pre-processed digitized set of in-phase and quadrature data to produce an x-y-combined output S(n);
    performing, by the DSP, a differential beating on the x-y-combined output to generate a single polarization diversity $\zeta(n)$; and
    generating, by the DSP, an output indicative of acoustic impulse(s) interacting with the optical sensing fiber from the generated single polarization diversity.

2. The method of claim 1 further comprising:
    the x-y-combining includes a two-step rotation having an x-y alignment step followed by a phase continuity step.

3. The method of claim 2 wherein the x-y alignment step rotates a polarization of a lower averaged power data to a higher averaged power data.

4. The method of claim 3 wherein the phase continuity step rotates an updated angle such that phase continuity is maintained.

5. The method of claim 4 wherein an averaged phase difference $P_{diff}(n)$ used in the rotations is the normalized to $P_{diff}(n)/|P_{diff}(n)|$, where $P_{diff}(n)$ is the phase difference at data n.

* * * * *